(12) United States Patent
Rankin et al.

(10) Patent No.: US 7,117,311 B1
(45) Date of Patent: Oct. 3, 2006

(54) HOT PLUG CACHE COHERENT INTERFACE METHOD AND APPARATUS

(75) Inventors: Linda J. Rankin, Portland, OR (US); Shivnandan D. Kaushik, Portland, OR (US); James B. Crossland, Banks, OR (US); Mohan J. Kumar, Aloha, OR (US); David J. O'Shea, Costa Mesa, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 10/027,397

(22) Filed: Dec. 19, 2001

(51) Int. Cl.
G06F 13/00 (2006.01)

(52) U.S. Cl. ............... 711/146; 711/115; 710/301; 710/302; 710/304

(58) Field of Classification Search ........... 711/141, 711/146, 154; 710/302
See application file for complete search history.

(56) References Cited

U.S. PATENT DOCUMENTS

| | | | | |
|---|---|---|---|---|
| 6,098,132 | A * | 8/2000 | Olarig et al. | 710/302 |
| 6,151,649 | A * | 11/2000 | Liong et al. | 710/314 |
| 6,282,596 | B1 * | 8/2001 | Bealkowski et al. | 710/302 |
| 6,330,656 | B1 * | 12/2001 | Bealkowski et al. | 712/13 |
| 6,487,623 | B1 * | 11/2002 | Emerson et al. | 710/302 |
| 6,529,987 | B1 * | 3/2003 | Reid | 710/302 |
| 6,564,279 | B1 * | 5/2003 | Neil et al. | 710/302 |
| 6,587,909 | B1 * | 7/2003 | Olarig et al. | 710/302 |
| 6,598,123 | B1 * | 7/2003 | Anderson et al. | 711/133 |
| 2003/0093630 | A1 * | 5/2003 | Richard et al. | 711/154 |
| 2003/0101314 | A1 * | 5/2003 | Piccirillo et al. | 711/106 |
| 2003/0131202 | A1 * | 7/2003 | Khare et al. | 711/146 |

OTHER PUBLICATIONS

Enterprise Class Server Scalability and RAS using the Intel® 870 Chipset; Spring '01 Intel Developer Forum Conference; Lily Looi, Linda Rankin, Architects, Enterprise Platform Group, Intel Corporation, Feb. 27-Mar. 1, 2001 (25 pgs.).

The Intel® 870 Family of Enterprise Chipsets; Faye Briggs, Michel Cekleov*, Kai Cheng, Ken Creta, Manoj Khare, Steve Kulick, Akhilesh Kumar, Lily Looi, Chitra Natarajan, Linda Rankin; Enterprise Products Group, Intel® Corporation, Hot Chips XIII (27 pgs).

Hot-Plug PCI on Windows Operating Systems; Microsoft Windows Driver and Hardware Development; http://www.microsoft.com/hwdev/pci/hotplugpci.htm Oct. 2, 2001 (10 pgs).

Technology Brief; PCI Hot Plug Technology; Jun. 1998, Compaq Computer Corporation, ECG Technology Communications (7 pgs).

* cited by examiner

Primary Examiner—Mano Padmanabhan
Assistant Examiner—Jasmine Song
(74) Attorney, Agent, or Firm—Jeffrey B. Huter

(57) ABSTRACT

A computing device maintains coherency while supporting addition and removal of memory caching agents without rebooting the computing device.

26 Claims, 14 Drawing Sheets

HOT PLUG CACHE COHERENT INTERFACE METHOD AND APPARATUS

RELATED APPLICATIONS

This application is related to application Ser. No. 10/028,858, entitled "Hot Plug Interface Control Method and Apparatus"; filed on the same date as the present application.

BACKGROUND

Advances in technology have opened up many opportunities for applications that go beyond the traditional ways of doing business. Electronic commerce over the Internet has become widely accepted, requiring many companies to either install one or more computing devices to host a web site and maintain accessible databases or to contract with data centers to provide such services. In addition to performance, important functional characteristics for these computing devices include reliability, availability and scalability.

One manner by which reliability, availability and scalability of computing devices has been increased is by allowing certain peripheral components to be added to and removed from a running computing device without rebooting. For example, the PCI (Peripheral Component Interconnect) Hot-Plug Specification, Revision 1.1, Jun. 20, 2001 describes a manner by which PCI add-in cards such as, for example, network cards, ATA (Advanced Technology Attachment) controllers, SCSI (Small Computer System Interface) controllers, USB (Universal Serial Bus) controllers, and Firewire (a.k.a 1394) controllers may be added to and removed from a running computing device. However, PCI hot plug does not provide for adding and removing processors, memory, and I/O hubs to and/or from a running computing device. Accordingly, reliability, availability, and scalability of computing devices may be further enhanced by supporting hot plug addition and/or hot plug removal of processors, memory, and/or I/O hubs.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

Composite

DETAILED DESCRIPTION

In the following detailed description, numerous specific details are described in order to provide a thorough understanding of the invention. However, the present invention may be practiced without these specific details. In other instances, well-known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
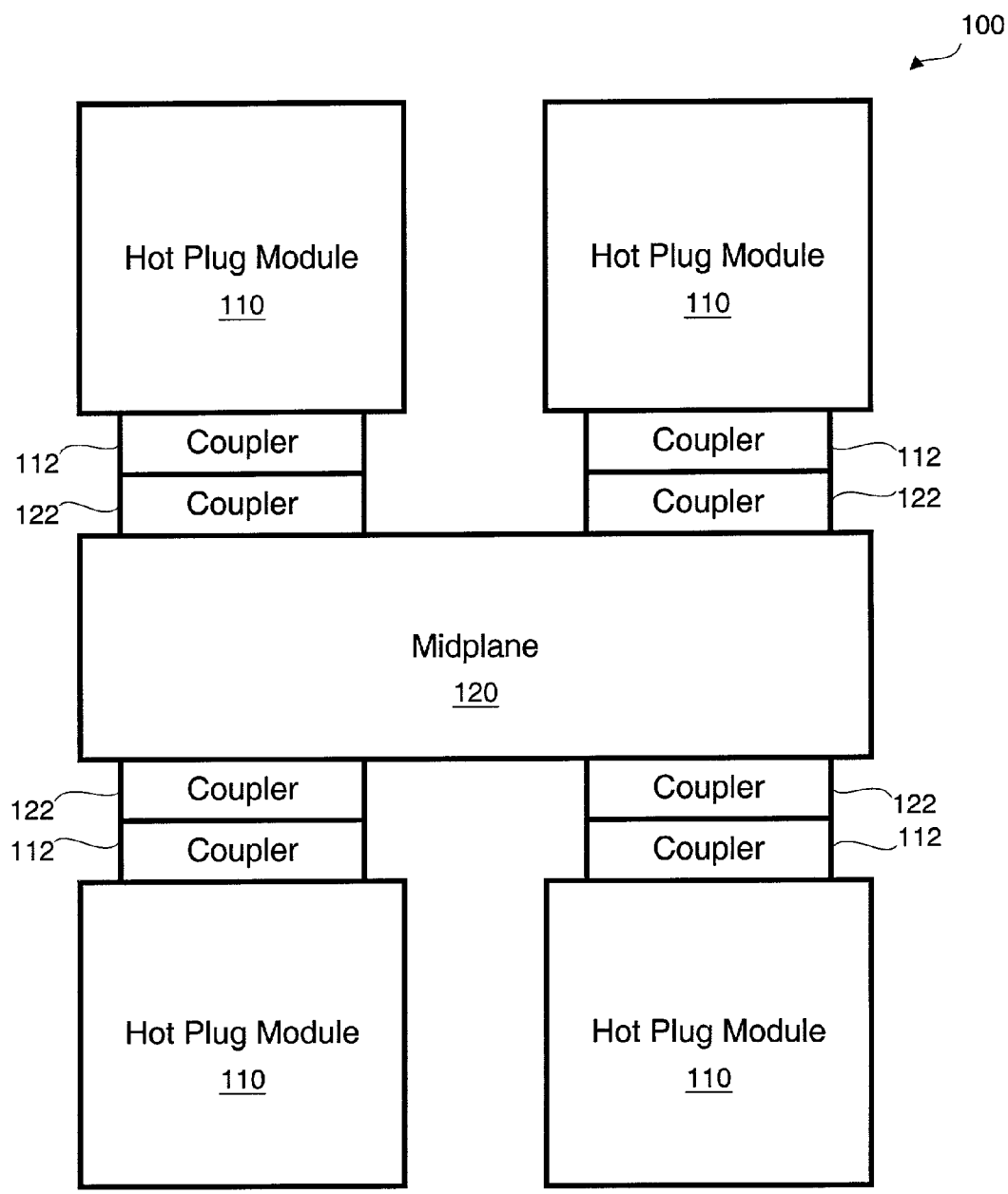
FIG. 1 illustrates an example computing device comprising hot plug modules.

Referring to FIG. 1, an example computing device 100 may comprise one or more hot plug modules 110 coupled to a midplane 120. The hot plug modules 110 may comprise one or more resource components such as, for example, processors, memory, input/output (I/O) hubs, and/or firmware that provide the computing device 100 with processing, storage, I/O, firmware, and/or other resources. The hot plug modules 110 and the midplane 120 may comprise couplers 112, 122 to support detachable coupling of the hot plug modules 110 to the midplane 120. The couplers 112, 122 may comprise one or more pins, stubs, contacts, receptacles, latches, switches and/or other mechanisms to detachably couple power signals, data signals, control signals, interrupt signals and/or other signals of the hot plug modules 110 with power signals, data signals, control signals, interrupt signals and/or other signals of the midplane 120.

As will be explained in further detail, the hot plug modules 110 and the midplane 120 may support hot plug addition and hot plug removal. During hot plug addition, a hot plug module 110 may be coupled to the midplane 120 while the computing device 100 is running and the resources of the hot plug module 110 may be added to the running computing device 100 without rebooting the computing device 100. During hot plug removal, a hot plug module 110 may be decoupled from the computing device 100 while the computing device 100 is running and the resources of the removed hot plug module 110 may be removed from the running computing device 100 without rebooting the computing device 100.

Figure 2:
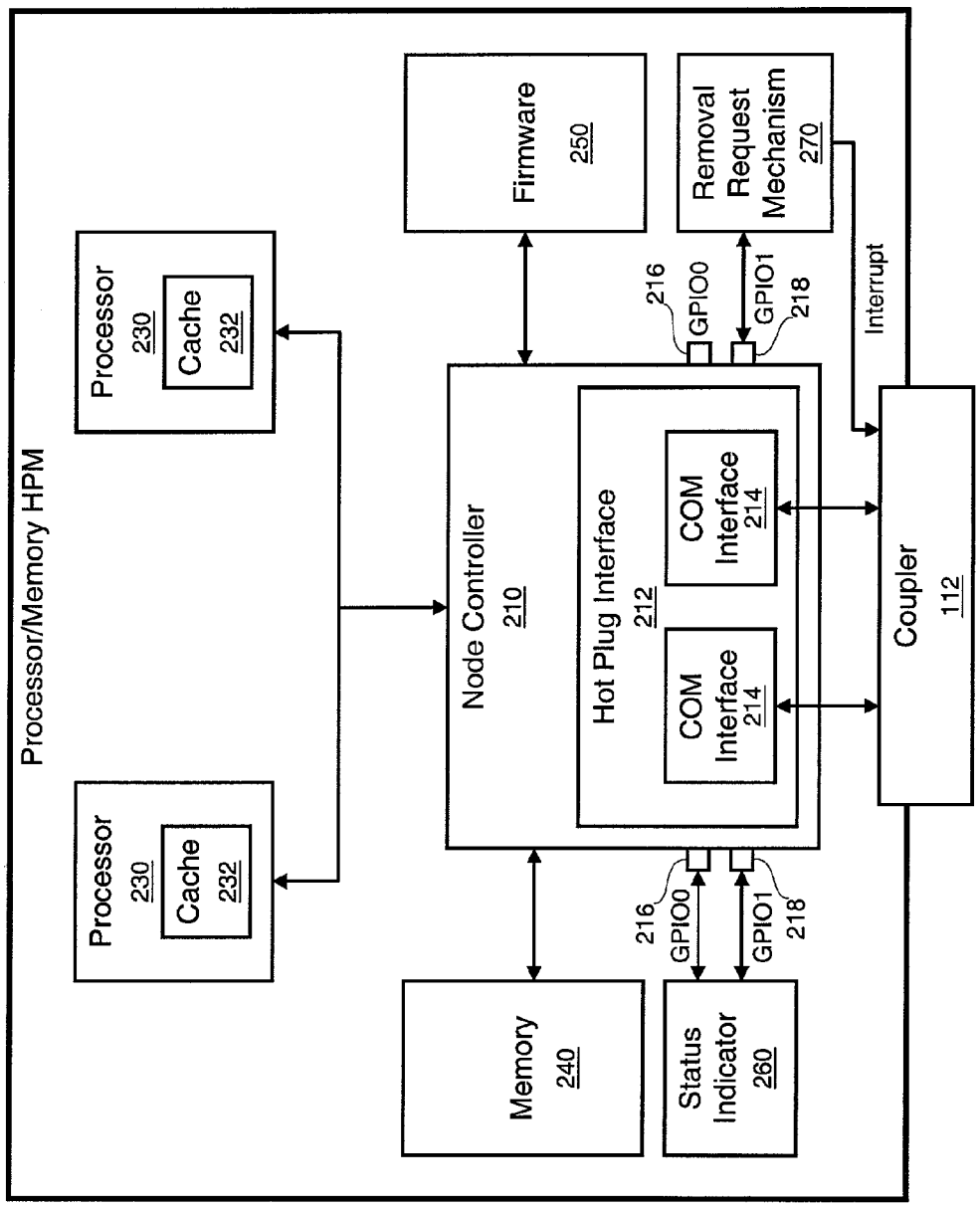
FIG. 2 illustrates an example processor/memory hot plug module of the computing device of FIG. 1.

Referring now to FIG. 2, an example processor/memory hot plug module (HPM) is shown which may be used to implement one or more hot plug modules 110 of the computing device 100. The example processor/memory HPM may comprise a node controller 210 having a hot plug interface 212. The hot plug interface 212 may comprise one or more communication interfaces 214 that are coupled to the coupler 112. As will be explained in more detail below, the hot plug interface 212 may support hot plug addition and/or hot plug removal of the processor/memory HPM. The node controller 210 may be further coupled to one or more processors 230, memory 240, and firmware 250. The processors 230 may comprise memory cache 232 to cache lines of one or more memories 240 of the computing device 100 and may maintain coherency of the memory cache 232 via snoop transactions. The memory caches 232 may be implemented as a multi-level hierarchy of caches that are internal and/or external to the processors 230. The memory 240 may comprise one or more memory modules arranged into one or more banks. The firmware 250 may store Basic Input/Output System (BIOS) routines, data, and/or other routines to initialize or partially initialize components of the processor/memory HPM and to establish communication with other hot plug modules 110 of the computing device 100.

The processor/memory HPM may further comprise a status indicator 260 coupled to the hot plug interface 212 of the node controller 210. The status indicator 260 may provide an indication as to the hot plug status of the processor/memory HPM. For example, the status indicator 260 may comprise a display device such as for example, one or more LEDs, LCDs, etc. that may provide visual indicators and/or an audio device such as a speaker that may provide audible indicators. For example, the status indicator 260 may indicate the processor/memory HPM has successfully joined the computing device 100, has successfully left the computing device 100, is in the process of joining the computing device 100, is in the process of leaving the computing device 100, and/or has encountered some sort of error condition.

The node controller 210 may further comprise one or more general purpose input/output pins or terminals (GPIO0, GPIO1) 216, 218 associate with each communications interface 214. The status indicator 260 may be coupled to the GPIO0 pin 216 and the GPIO1 pin 218 associated with one of the communications interfaces 214. Further, the status indicator 260 may provide a status indicator for the processor/memory HPM that is based upon the status of the GPIO0 pin 216 and the GPIO1 pin 218.

The processor/memory HPM may further comprise a hot removal mechanism 270. The hot removal mechanism 270 may comprise a switch, latch, button and/or some other mechanical mechanism that in response to being actuated may cause the processor/memory HPM to generate a hot removal request and a hot plug interrupt. For example, the hot removal mechanism 270 may comprise a button coupled to a GPIO1 pin 218 of the node controller 210 and an interrupt line of the coupler 112. In response to actuation of the button, the hot removal mechanism 270 may provide the node controller 210 with a hot plug removal request and the running computing device 100 with a hot plug interrupt.

Figure 3:
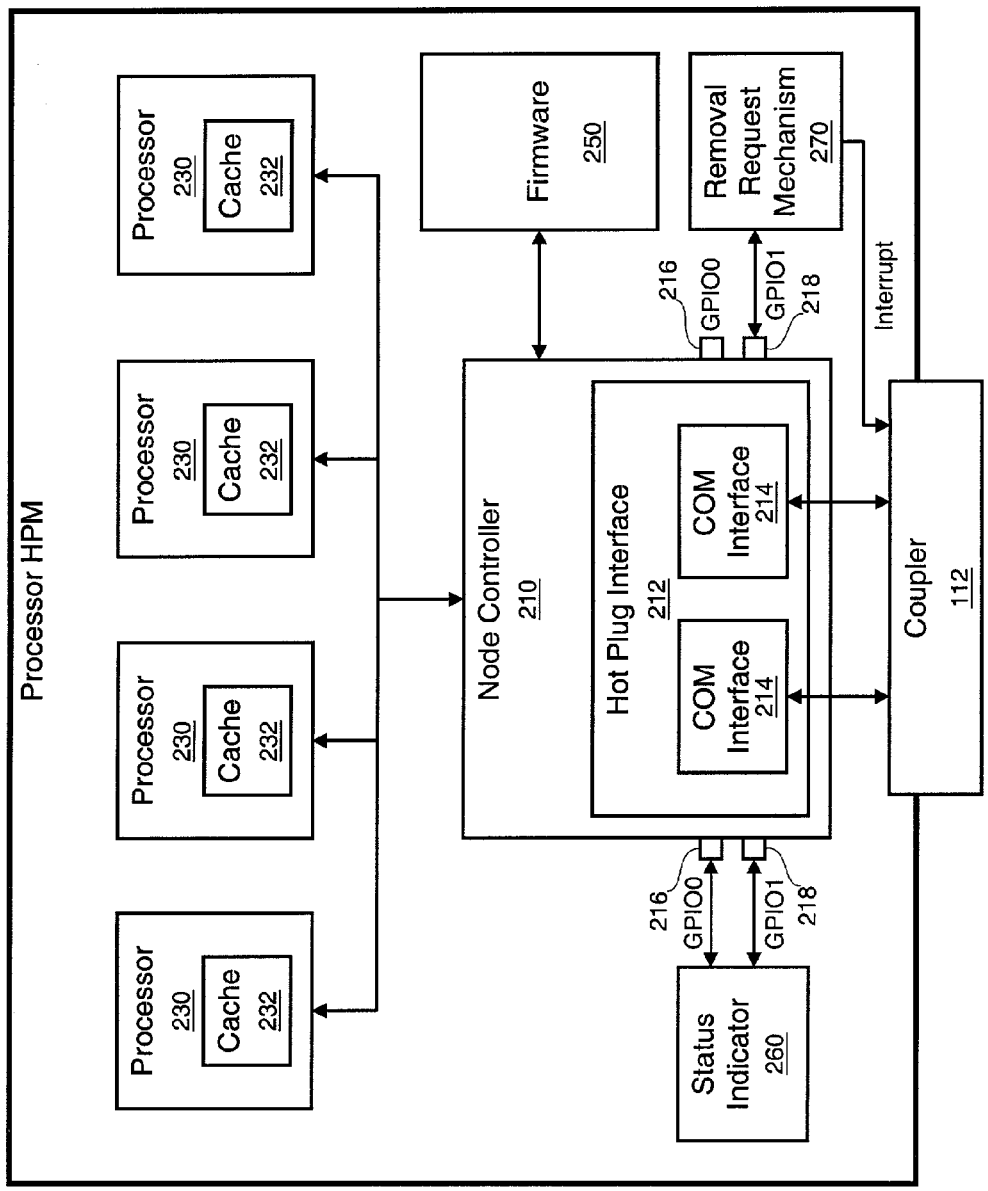
FIG. 3 illustrates an example processor hot plug module of the computing device of FIG. 1.

An example processor HPM is shown in FIG. 3 which may be used to implement one or more hot plug modules 110 of the computing device 100. The processor HPM may be implemented in a manner similar to the processor/memory HPM of FIG. 2. The processor HPM generally provides the computing device 100 with one or more processors 230 and includes additional components to support the one or more processors 230 and to support hot plug of the processor HPM. For example, the processor HPM may comprise a coupler 112, a node controller 210, one or more processors 230, firmware 250, a status indicator 260, and a removal request mechanism 270 but may be implemented without the memory 240 shown in FIG. 2.

Figure 4:
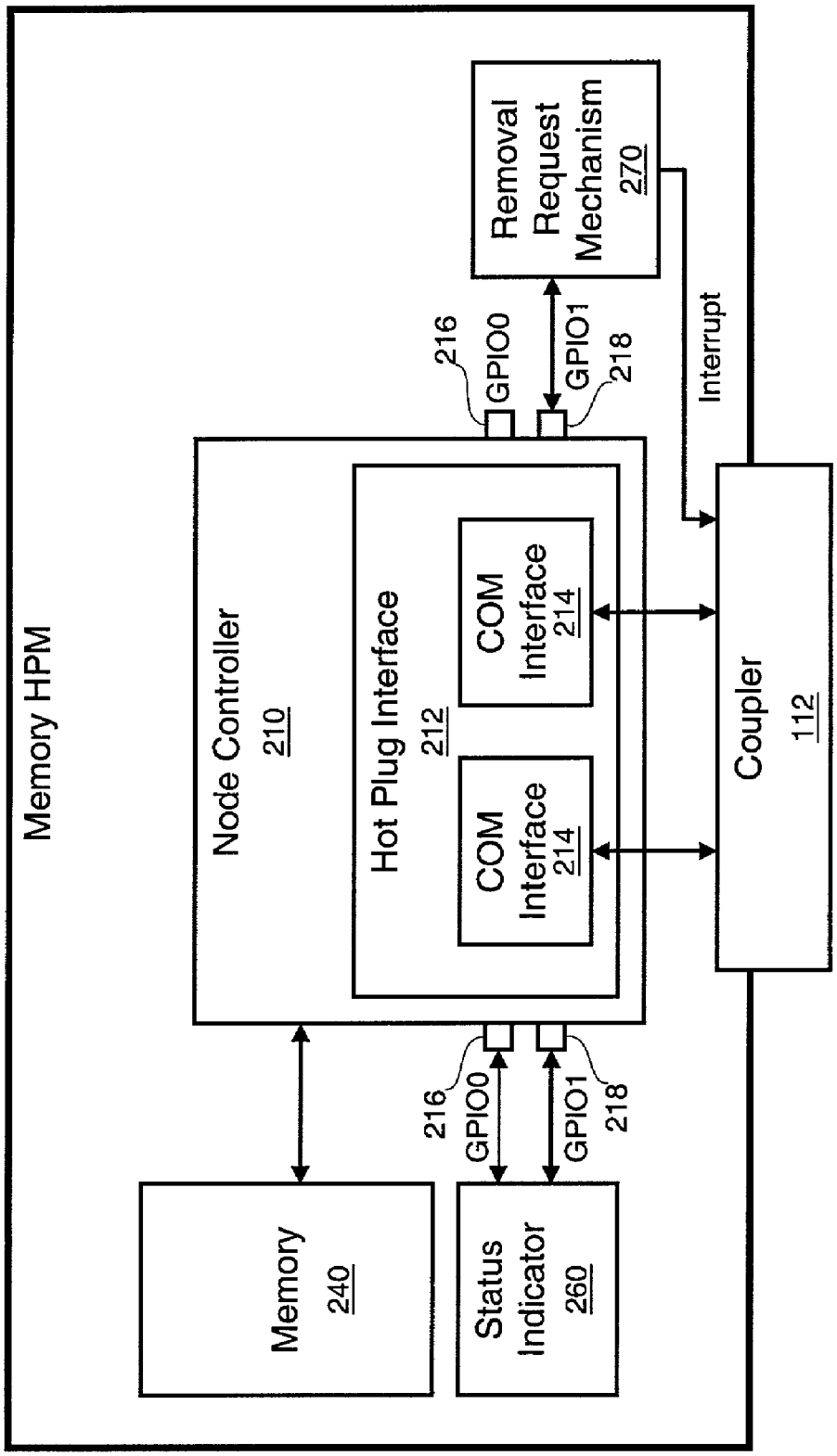
FIG. 4 illustrates an example memory hot plug module of the computing device of FIG. 1.

An example memory HPM is shown in FIG. 4 which may be used to implement one or more hot plug modules 110 of the computing device 100. The memory HPM may be implemented in a manner similar to the processor/memory HPM of FIG. 2. The memory HPM generally provides the computing device 100 with memory 240 and includes additional components to support the memory 240 and to support hot plug of the memory HPM. For example, the memory HPM may comprise a coupler 112, a node controller 210, memory 240, a status indicator 260, a request removal mechanism 270, but may be implemented without the processors 230 shown in FIG. 2.

Figure 5:
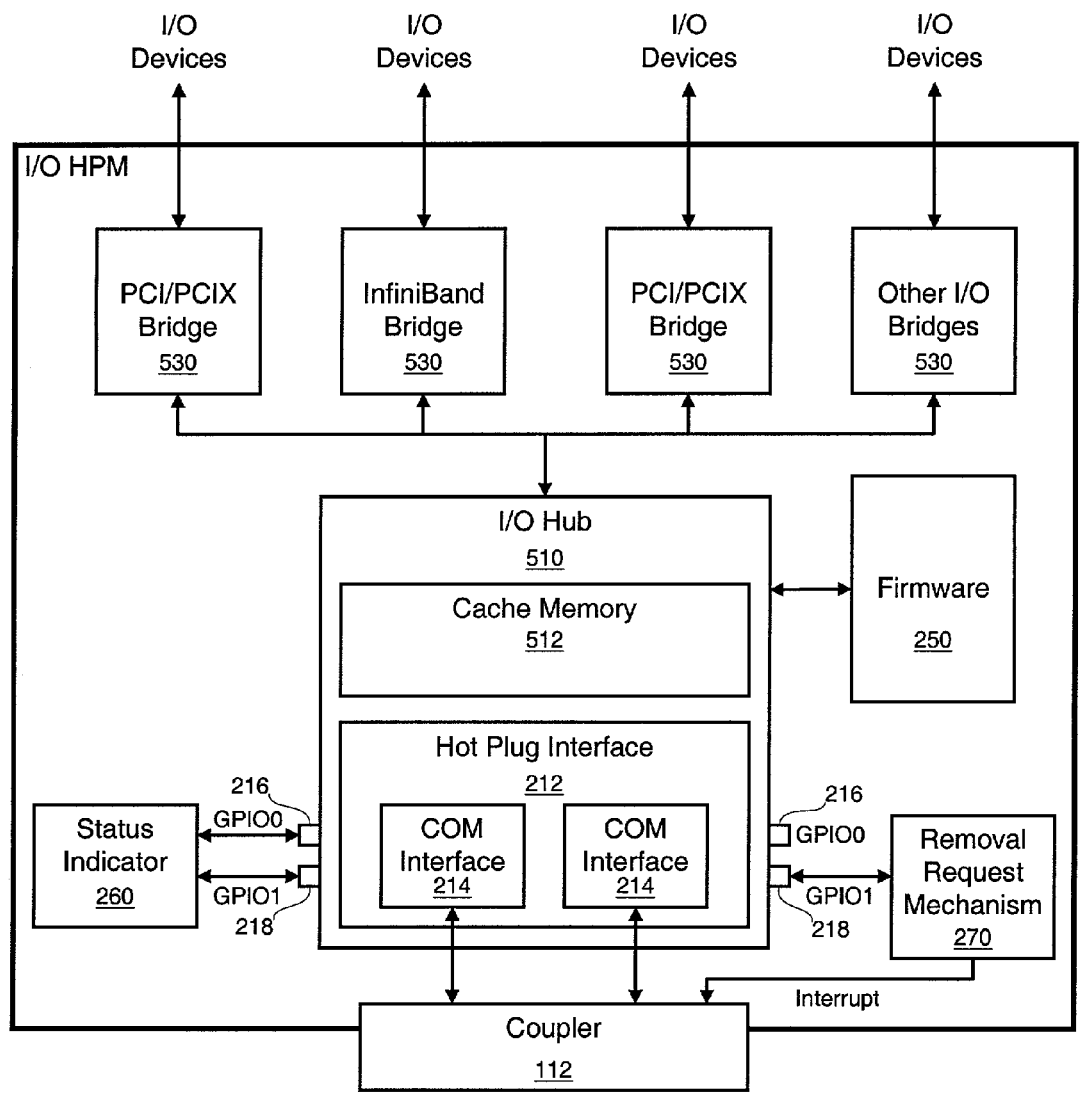
FIG. 5 illustrates an example I/O hot plug module of the computing device of FIG. 1.

Referring now to FIG. 5, an example input/output (I/O) HPM is shown which may be used to implement one or more hot plug modules 110 of the computing device 100. The example I/O HPM 500 may comprise an I/O hub 510 having a hot plug interface 212. The hot plug interface 212 may comprise one or more communication interfaces 214 that are coupled to a coupler 112. The I/O hub 510 may be coupled to one or more I/O bridges 530 to provide access to I/O devices that utilize various signaling protocols. For example, the I/O HPM may include Peripheral Component Interconnect (PCI) bridges, a high speed Peripheral Component Interconnect (PCI-X) bridges, Infiniband bridges, Industry Standard Architecture (ISA) bridges, High Speed Interconnect (HSI) bridges, Universal Serial Bus (USB) bridges, Advanced Technology Attachment (ATA) bridges, Small Computer System Interface (SCSI) bridges, as well as interfaces to keyboards, mice and other devices.

The I/O hub 510 may be further coupled to firmware 250. The firmware 250 may store Basic Input/Output System (BIOS) routines, data, and/or other routines to initialize or partially initialize components of the I/O HPM and to establish communication with other hot plug modules 110 of the computing device 100 via one or more communication interfaces 214 of the I/O HPM. The I/O hub 510 may be further coupled to a status indicator 260 and a hot removal request mechanism 270. The status indicator may provide an indication as to the hot plug status of the I/O HPM. The hot removal request mechanism 270 may generate a hot removal request and a hot plug interrupt in response to being actuated.

The I/O hub 510 may further include comprise memory cache 512 to cache lines of one or more memories 240 of the computing device 100. The memory caches 512 associated with the I/O hub 510 may be implemented as a multi-level hierarchy of caches that are internal and/or external to the I/O hub 510. For example, the memory cache 512 may store read ahead data retrieved from one or more memories 240 of the running computing device 100 in anticipation of future data requests of the I/O devices attached to the I/O bridges 530. Further, the memory cache 512 may store data received from the I/O devices attached to the I/O bridges 530 that is to be later written to one or more memories 240 of the running computing device 100. To maintain coherency with the memory 240 of the running computing device 100, the I/O hub 510 may participate in snoop transactions of the midplane 120.

Figure 6:
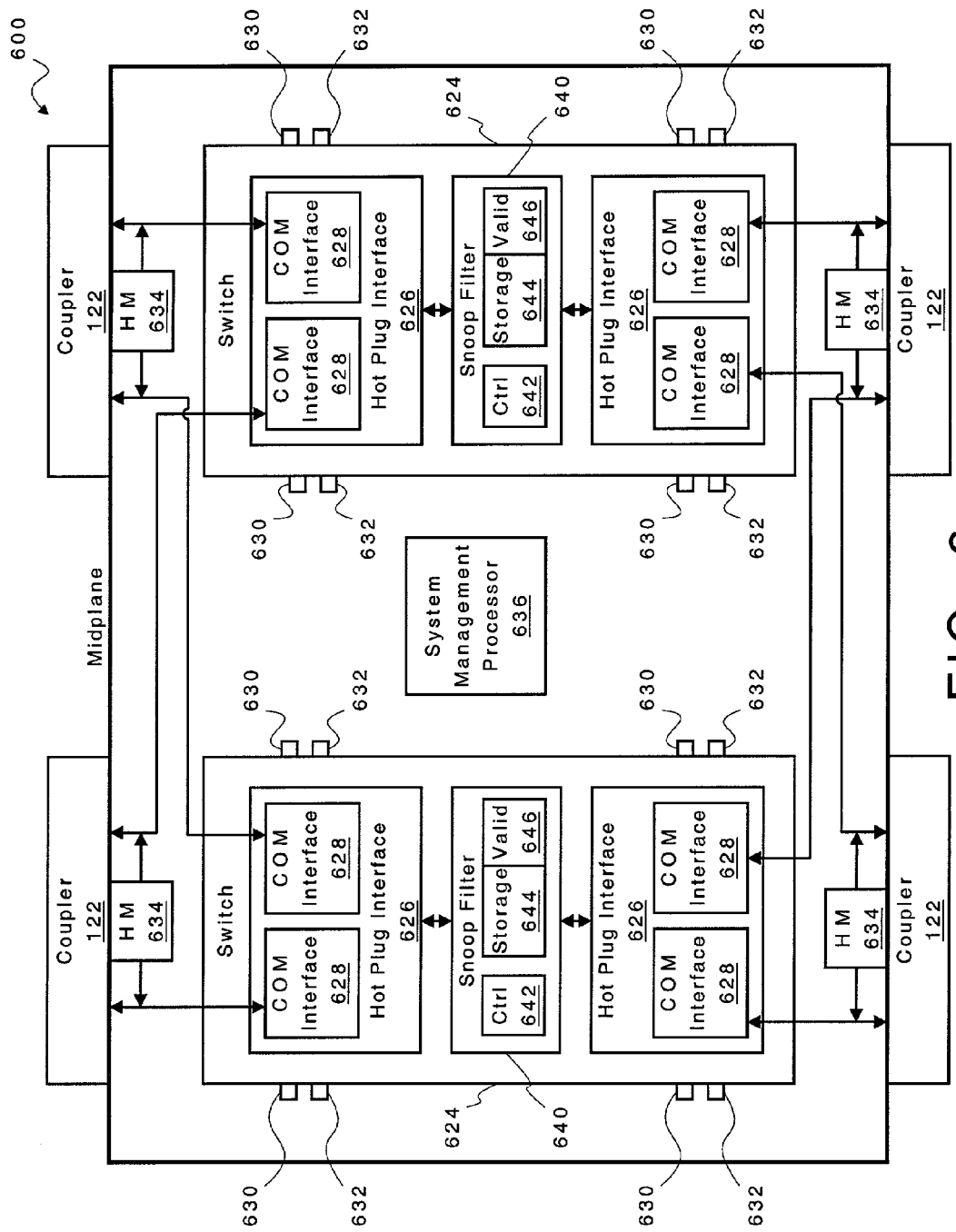
FIG. 6 illustrates an example midplane of the computing device of FIG. 1.

The example midplane 120 is shown in more detail in FIG. 6. The midplane 120 may comprise one or more switches 624 to control data transfers between hot plug modules 110 and to help maintain coherency of memory caches 232, 512 of the hot plug modules 110. The switches 624 may comprise one or more hot plug interfaces 626 comprising one or more communication interfaces 628 that are coupled to the couplers 122. As will be explained in more detail below, the hot plug interfaces 626 and communications interfaces 628 may support hot plug addition and hot plug removal of hot plug modules 110. Further, each communication interface 628 may be associated with one or more GPIO pins or terminals 630, 632.

The midplane 120 may further comprise a hot plug monitors 634 associated with each coupler 122. The hot plug monitor 634 may provide communication interfaces 628 associated with a coupler 122 a signal indicative of whether a hot plug module 110 is coupled to the respective coupler 122. For example, the hot plug monitor 634 may comprise a mechanical latch that may be actuated to secure the hot plug module 110 to the midplane 120, and that may provide a signal that indicates a hot plug module is present in response to being actuated. Alternatively, the hot plug monitor 634 may comprise a module present pin of the coupler 122 to generate the signal indicative of whether a hot plug module 110 is coupled to the coupler 122. For example, the module present pin may be physically staggered from other pins of the coupler 122 such that the module present pin is the last to make electrical contact in response to insertion of a hot plug module 110 and the first to become electrically detached in response to removal of a hot plug module 110.

The midplane 120 may further comprise an optional system management processor 636. The system management processor 636 may be coupled to the couplers 122 to monitor, access and/or control components of hot plug modules 110 coupled to the couplers 122. The system management processor 636 may initialize components of hot plug modules 110 that lack processors 230 such as the memory HPM of FIG. 4 and the I/O HPM of FIG. 5. In an example embodiment, a serial scan chain and/or other communication path (not shown) couples the system management processor 636 to components of the hot plug modules 110 through the couplers 122 of the midplane 120.

The switches 624 may further comprise snoop filters 640 that track cache line coherency information for memory caches 232, 512 of the computing device 100. The snoop filters 640 may serve in part to keep snoop transactions from being performed at hot plug modules 110 that do not contain a copy of the subject cache line, thereby reducing system overhead, reducing traffic between hot plug modules 110, and reducing the amount of time required to perform snoop operations. To this end, the snoop filters 640 may comprise a controller 642, storage 644, and a valid vector 646.

The controllers 642 may store and update in the storage 644 tag addresses and coherency states for lines cached by caching agents (e.g. processors 230, I/O hub 510) of the hot plug modules 110. The controllers 642 may further control routing of snoop transactions to hot plug modules 110 based upon tag addresses and coherency states of the storage 644, valid snooping agent information of the valid vector 646, and a coherency protocol. For example, the controllers 642 may utilize a variant of the well known MESI (Modified, Exclusive, Shared, Invalid) protocol to track whether a cache line is invalid, shared, or combined modified/exclusive. In an example embodiment, the full MESI protocol is supported at the memory caches 232, 512 of the hot plug modules 110. Other coherency protocols may be used so long as transactions at all of the caching agents of the computing device 100 are consistent.

The controllers 642 may further store and update presence information in the storage 644 that is indicative of which hot plug modules 110 have a copy of a line. For example, the controllers 642 may track which hot plug modules 110 have a copy of a line of a memory 240 via an associated presence vector of the storage 644. The presence vector may comprise a field of bits where each bit in the field corresponds to a particular coupler 122 and associated hot plug module 110.

Instead of a presence vector, alternative embodiments are possible. For example, the switches 624 may collectively comprise a different snoop filter 640 for each coupler 122 and associated hot plug modules 110. Alternatively, the snoop filters 640 may be implemented such that entries of the storage 644 apply to one node, other entries of the storage 644 apply to another node, and so on.

The controllers 644 may further cease to issue snoop transactions to couplers 122 associated with hot plug module 110 that has been removed. For example, the snoop filter 640 may comprise a valid vector 646 to track which couplers 122 have valid snooping agents coupled thereto so that the snoop filter 640 may provide an appropriate snoop response for lines that were cached by caching agents of a removed or to be removed hot plug module 110. The valid vector 646 may be implemented as part of the storage 644, as a portion of one or more registers, or as a separate register of the snoop filter 640. Further, the valid vector 646 may comprise a field of bits where each bit in the field corresponds to a particular coupler 122 and associated hot plug module 110.

Instead of a valid vector, alternative embodiments are possible. For example, the switches 624 may collectively comprise for each coupler 122 a different snoop filter 640 that may be enabled and disabled based upon whether a valid snooping agent is coupled to the associated coupler 122. Alternatively, the snoop filters 640 may be implemented to clear the bits of each presence vector associated with couplers 122 associated with hot plug modules 110 to be removed or that have been removed to prevent snoop transactions to such couplers 122.

The controllers 642 may further signal that all pending transactions associated with a hot plug module 110 have been completed. For example, the controllers 642 may issue a fencing transaction via the communication interface 628 associated with a hot plug module 110 to be removed. The controller 642 may then determine that all pending transactions of the hot plug module 110 have been completed in response to receive a fencing transaction complete response from the hot plug module 110. The controller 642 may then signal the completion of the pending transactions by generating an interrupt. Alternatively or in addition, the controller 642 may signal the completion of the pending transactions by updating status information associated with the coupler 122 and the hot plug module 110. A processor 230 of the computing device may later read or poll the status information to determine whether all transactions of the hot plug module 110 have been completed.

Figure 7:
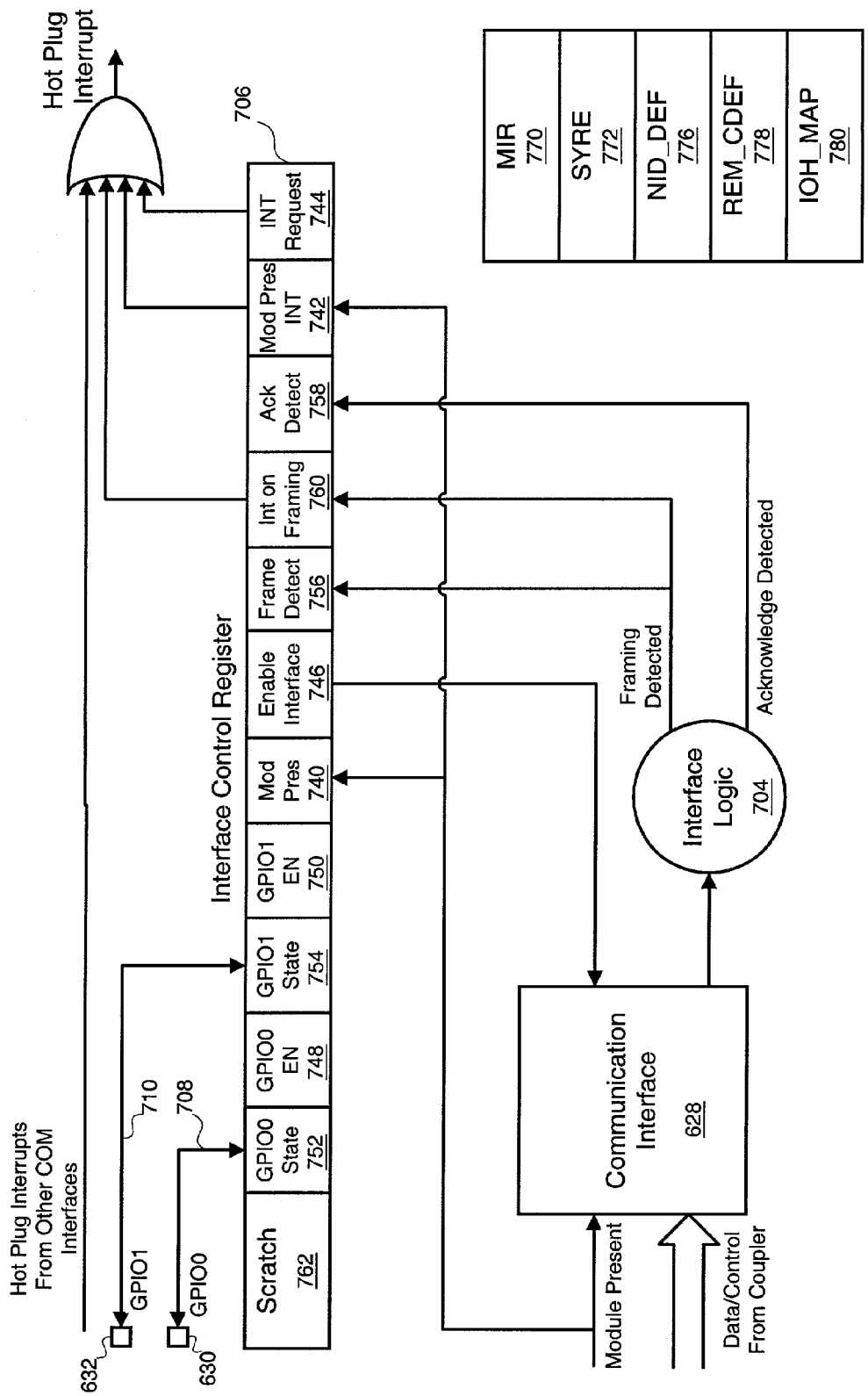
FIG. 7 illustrates portions of an example hot plug interface associated with a communication interface of the computing device of FIG. 1.

A hot plug interface 626 and its association with a communication interface 626 are shown in greater detail in FIG. 7. It should be appreciated that the hot plug interfaces 212 of the hot plug modules 110 may be implemented in a similar manner. The hot plug interface 626 may comprise interface logic 704, an interface control register 706, and GPIO conductors 708, 710 coupled to GPIO pins 630, 632. The hot plug interface 626 may comprise separate interface logic 704, interface control registers 706, and GPIO conductors 708, 710 for each communication interface 628.

The interface logic 704 may control the communication interface 628 to send and/or receive electrical signals in accordance with a communications protocol utilized by other communication interfaces 628 of the running computing device 100. Further, the interface logic 704 may cause the communication interface 628 to establish a communication link with a communication interface 214 of a hot plug module 110 and may detect that such a communication link has been established.

For example, the interface logic 704 may tune a receiver of the communication interface 628 based upon framing packets transmitted by the communication interface 214, and may cause a transmitter of the communication interface 628 to transmit framing packets. The interface logic 704 may then generate a framing detected signal in response to determining that the communication interface 628 has received a predetermined number (e.g. 256) of error free framing packets and may generate an acknowledgement detected signal in response to determining that the communication interface 628 has received a predetermined number (e.g. 256) of error free acknowledgement packets in response to its transmitted framing packets. The framing detected signal and acknowledgement detected signal generally provide an indicate that a communication link has been successfully established between the communication interfaces 214, 628. Further, it should be appreciated that other manners for establishing a communication link may be utilized.

The interface control register 706 of the hot plug interface 626 may comprise a module present field 740, a module present interrupt field 742 and an interrupt request field 744. In response to the signal of the associated hot plug monitor 634, the module present field 740 may be set to indicate a hot plug module 110 present and may be cleared to indicate a hot plug module 110 is not present. The module present interrupt field 742 may be set to cause a hot plug interrupt in response to a change in the module present field 740 and may be cleared to prevent generation of a hot plug interrupt in response to a change in the module present field 740. The interrupt request field 744 may be set to indicate and cause a hot plug interrupt and may be cleared to acknowledge and clear a hot plug interrupt. Hot plug interrupt request signals generated by the interrupt request fields 744 of the switches 624 may be coupled together in a wired-OR configuration so that an interrupt controller (not shown) may generate a hot plug interrupt in response to hot plug interrupt request signals received via a single interrupt request line.

The interface control register 706 may further comprise an interface enable field 746, a GPIO0 enable field 748, a GPIO1 enable field 750, a GPIO0 state field 752, a GPIO1 state field 754. The interface enable field 746 may be set to enable its associated communication interface 628 and may be cleared to disable its associated communication interface 628. The GPIO0 enable field 748 and the GPIO1 enable field 750 may be set to enable the GPIO0 state field 752 and the GPIO1 state field 754 to drive their respective GPIO pin 630, 632. Further, the GPIO0 enable field 748 and the GPIO1 enable field 750 may be cleared to prevent the GPIO0 state field 752 and the GPIO1 state field 754 from driving their respective GPIO pin 630, 632.

The interface control register 706 may also comprise a framing detected field 756, an acknowledgement detected field 758, and an framing interrupt field 760. In response to the framing detected signal, the framing detected field 756 may be set to indicate framing detected or may be cleared to indicate framing not detected. Similarly, the acknowledgement detected field 758 may be set to indicate acknowledgement detected or may be cleared to indicate acknowledgement not detected in response to the acknowledgement detected signal. The framing interrupt field 760 may be set to cause a hot plug interrupt in response to a change in the framing detected signal and may be cleared to prevent generation of a hot plug interrupt in response to a change in the framing detected signal.

The interface control register 706 may further comprise a scratch pad field 762. The scratch pad field 762 may be programmed to track a hot plug state and/or other configuration information of a communication interface 628 and associated hot plug module 110. For example, the scratch pad field 762 may be programmed to track whether a communication interface 628 and associated hot plug module 110 are in a no module present state, a module present state, a busy state, a ready state, or a joined state.

The hot plug interface 626 may further comprise other registers associated with the communication interface 628. For example, the hot plug interface 626 may comprise memory interleave registers 770 to allocate memory ranges to memory 240 of the associated hot plug modules 110, and system reset registers 772 to indicate available processors 230 of the associated hot plug modules 110. The hot plug interface 626 may also comprise module definition registers 776 to store a module identifier for the associated hot plug module 110, and remote module definition registers 778 to store an indication as to the type (e.g. processor/memory HPM, processor HPM, memory HPM, I/O HPM) of hot plug module 110 associated with the communication interface 628. The hot plug interface 626 may further comprise I/O map registers 780 to allocate memory ranges to I/O resources of the associated hot plug module 110.

Figure 8:
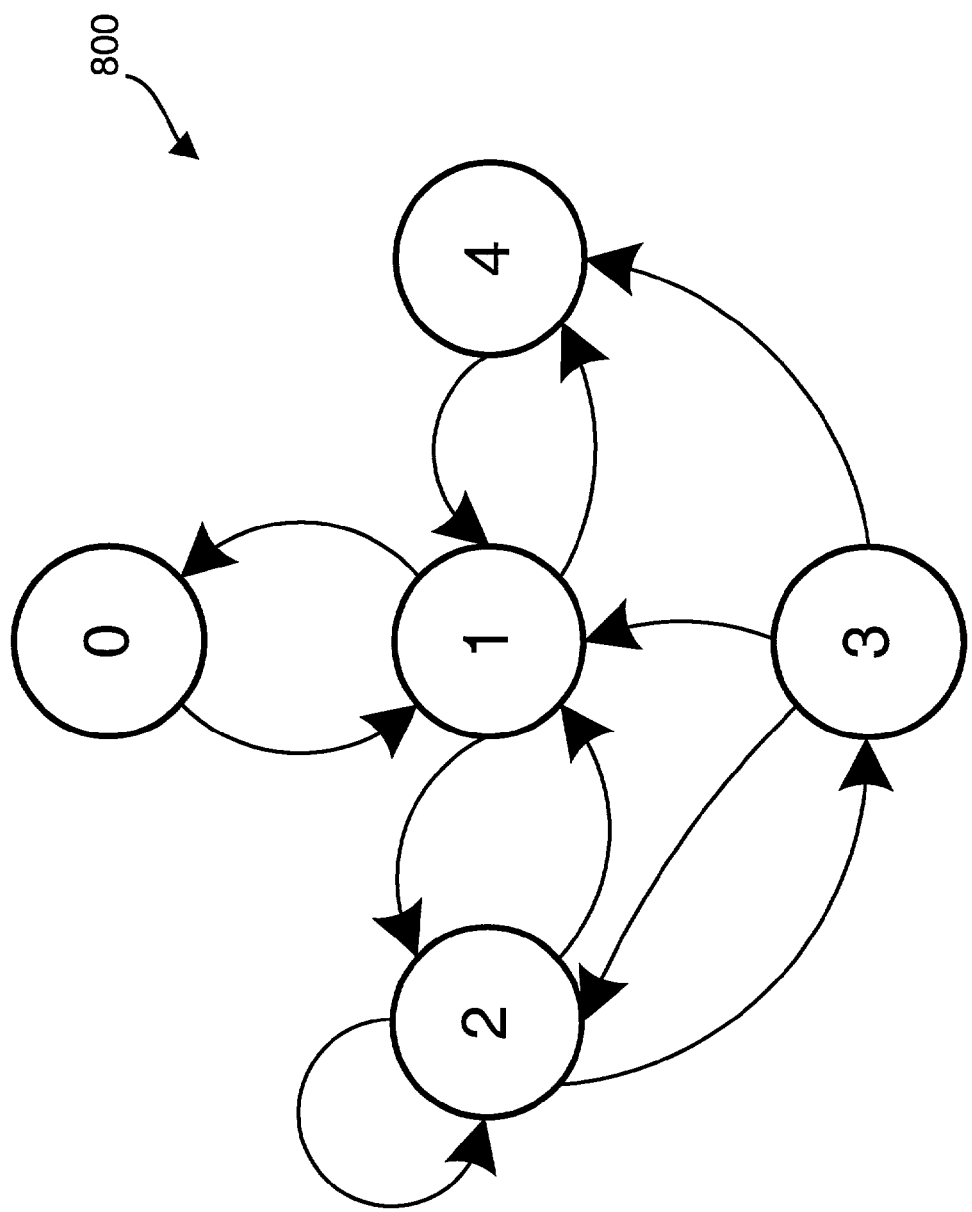
FIG. 8 illustrates an example state diagram for hot plug modules and associated communication interfaces of the computing device of FIG. 1.

Referring now to FIG. 8, an example state diagram 800 illustrates transitions between hot plug states in response to actions of the running computing device 100 and the hot plug modules 110. For example, the communication interfaces 628 and associated hot plug modules 110 may be in a no module present state (state 0), a module present state (state 1), a busy state (state 2), a ready state (state 3), and a joined state (state 4). The no module present state may correspond to a communication interface 628 that is not coupled to a hot plug module 110. The module present state may correspond to a communication interface 628 that has been coupled to a hot plug module 110. The busy state may correspond to a communication interface 628 that has established a communication link with a hot plug module 110 that is not yet ready to join the running computing device 100. The ready state may correspond to a communication interface 628 that has established a communications link with a hot plug module 110 that is ready to join the running computing device 100. The joined state may correspond to a communication interface 122 that is coupled to a hot plug module 110 that has joined the running computing device 100.

Referring now to FIGS. 9A–9H, a method 900 is illustrated for processing hot plug interrupts in order to add and/or remove hot plug modules 110 to and/or from the running computing device 100. A hot plug interrupt may be generated in response to various events. For example, in an example embodiment, the running computing device 100 during a startup process sets the module present interrupt fields 742 and the framing detected interrupt fields 760 of one of the switches 624 (the default switch). Accordingly, the interface control registers 706 of the default switch 624 may cause generation of a hot plug interrupt in response to a change in the module present field 740 or framing detected field 760. Further, the removal request mechanism 270 of one of the hot plug modules 110 may generate a hot plug interrupt in response to being actuated. A hot plug interrupt may also be generated in response to the running system 100 or a hot plug module 110 setting one of the interrupt request fields 744 of the default switch 624.

Further, the running computing device 100 and hot plug modules 110 may perform all or a subset of the method 900 in response to executing instructions of a machine readable storage medium such as, for example, one or more read only memory (ROM); random access memory (RAM); magnetic disk storage media; optical storage media; flash memory devices; and/or machine readable propagation media including electrical, optical, acoustical or other form of propagated signals such as, for example, carrier waves, infrared signals, digital signals, analog signals. Furthermore, while the method 900 illustrates operation of the running computing device 100 and hot plug modules 110 as a sequence of operations, the running computing device 100 and hot plug modules 110 may perform various operations in parallel or in a different order.

Figure 9A:
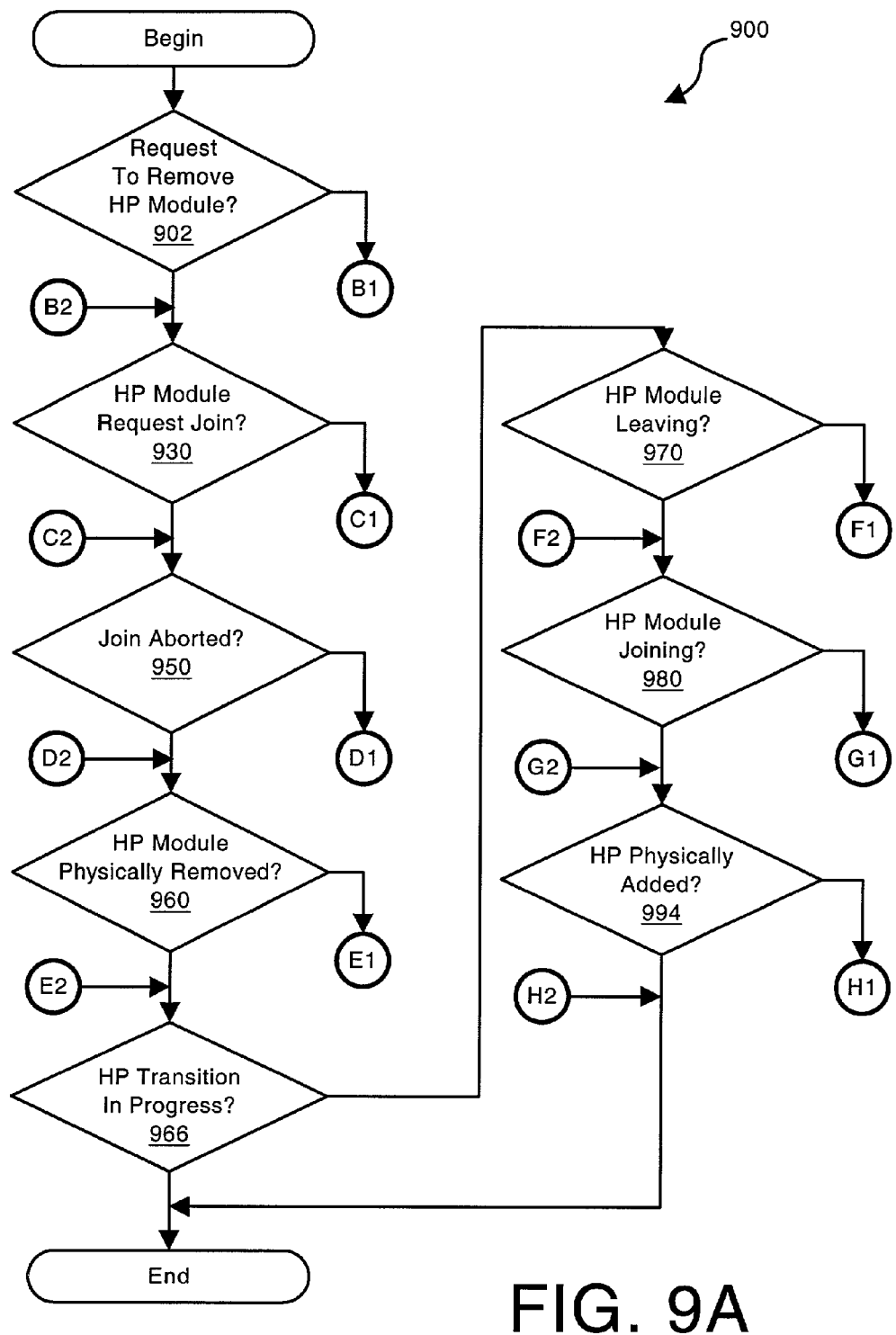
FIGS. 9A–9H illustrates a method for hot plug addition and hot plug removal of hot plug modules to and from the computing device of FIG. 1.
Figure 9B:
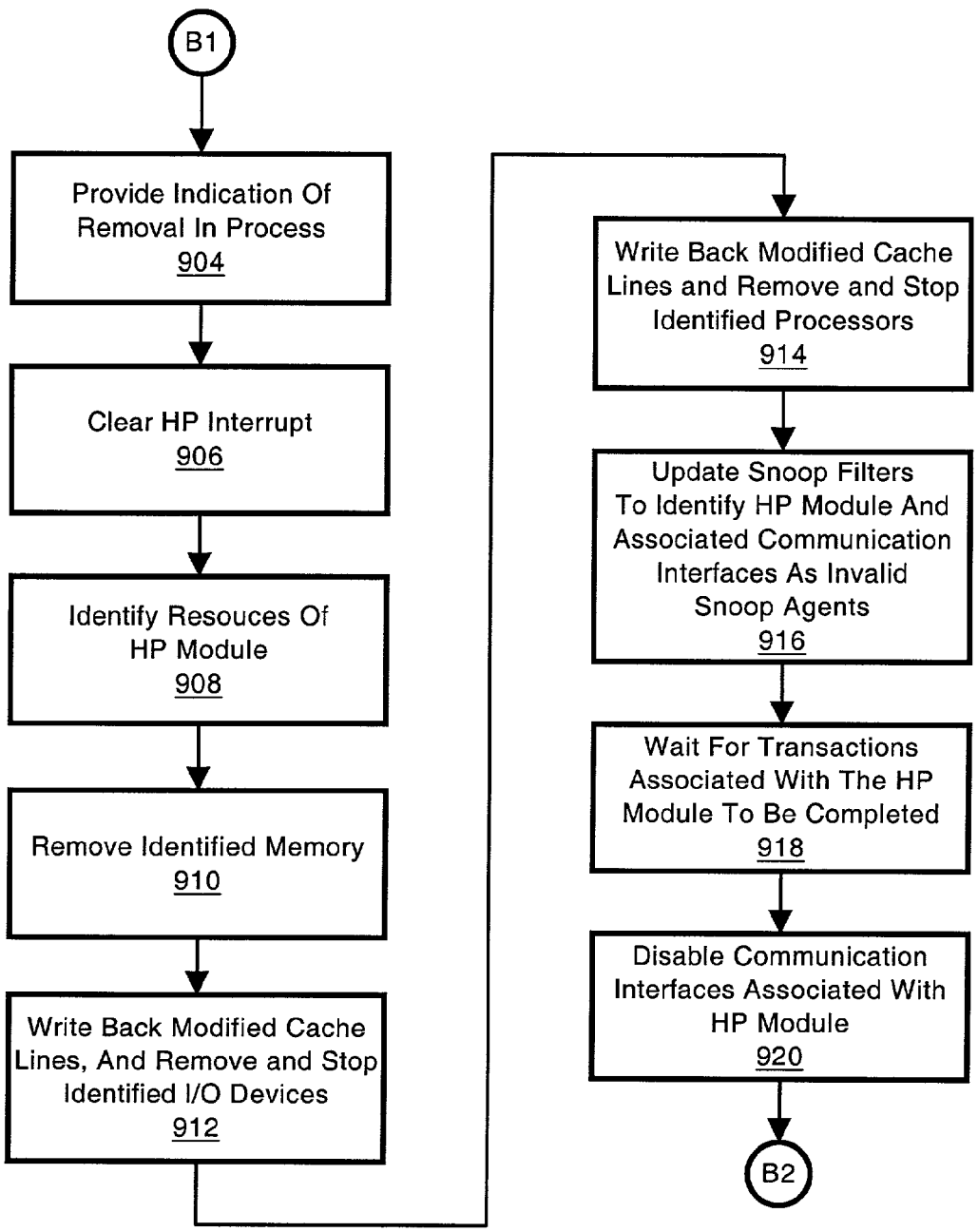
Figure 9C:
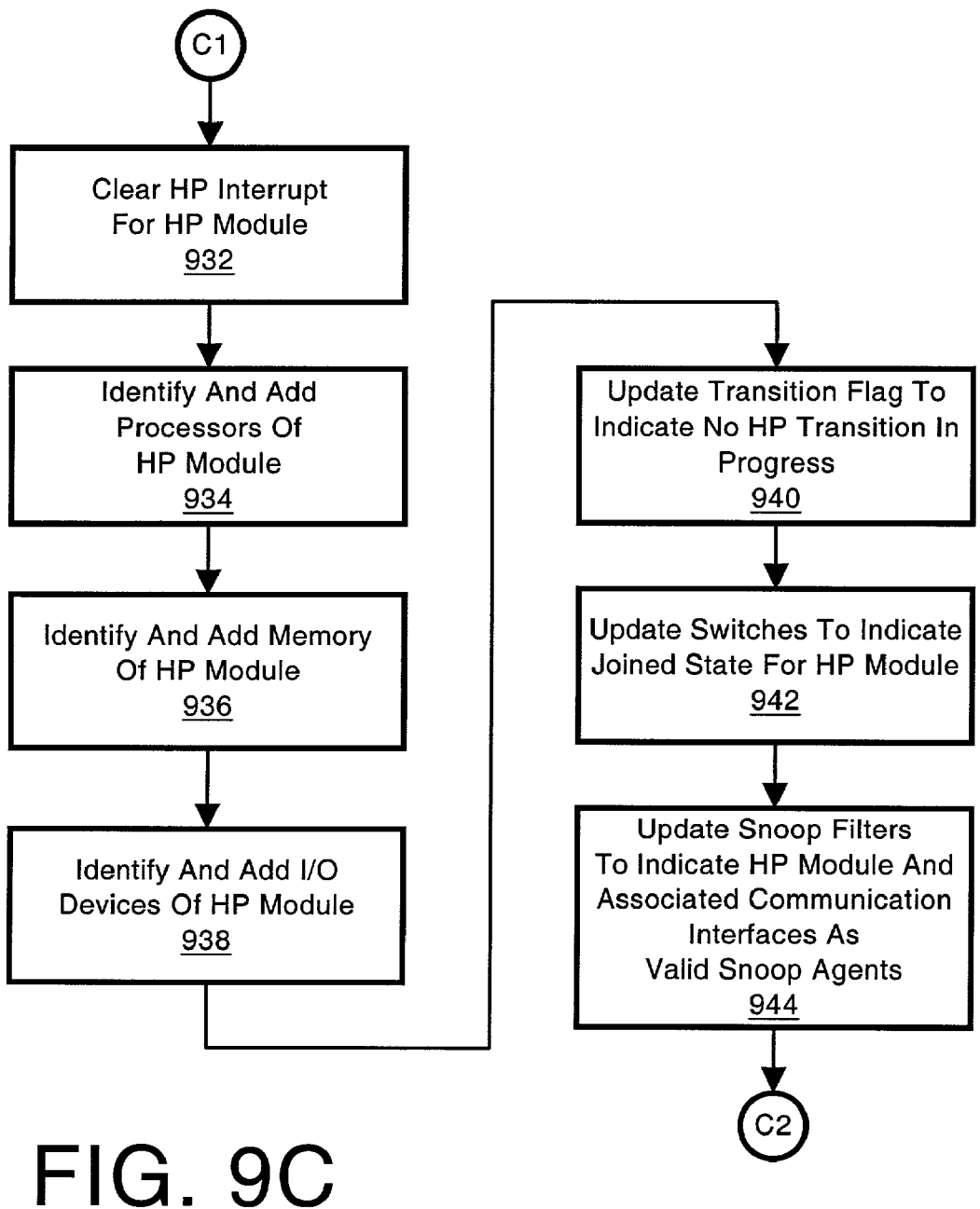
Figures 9D, 9E:
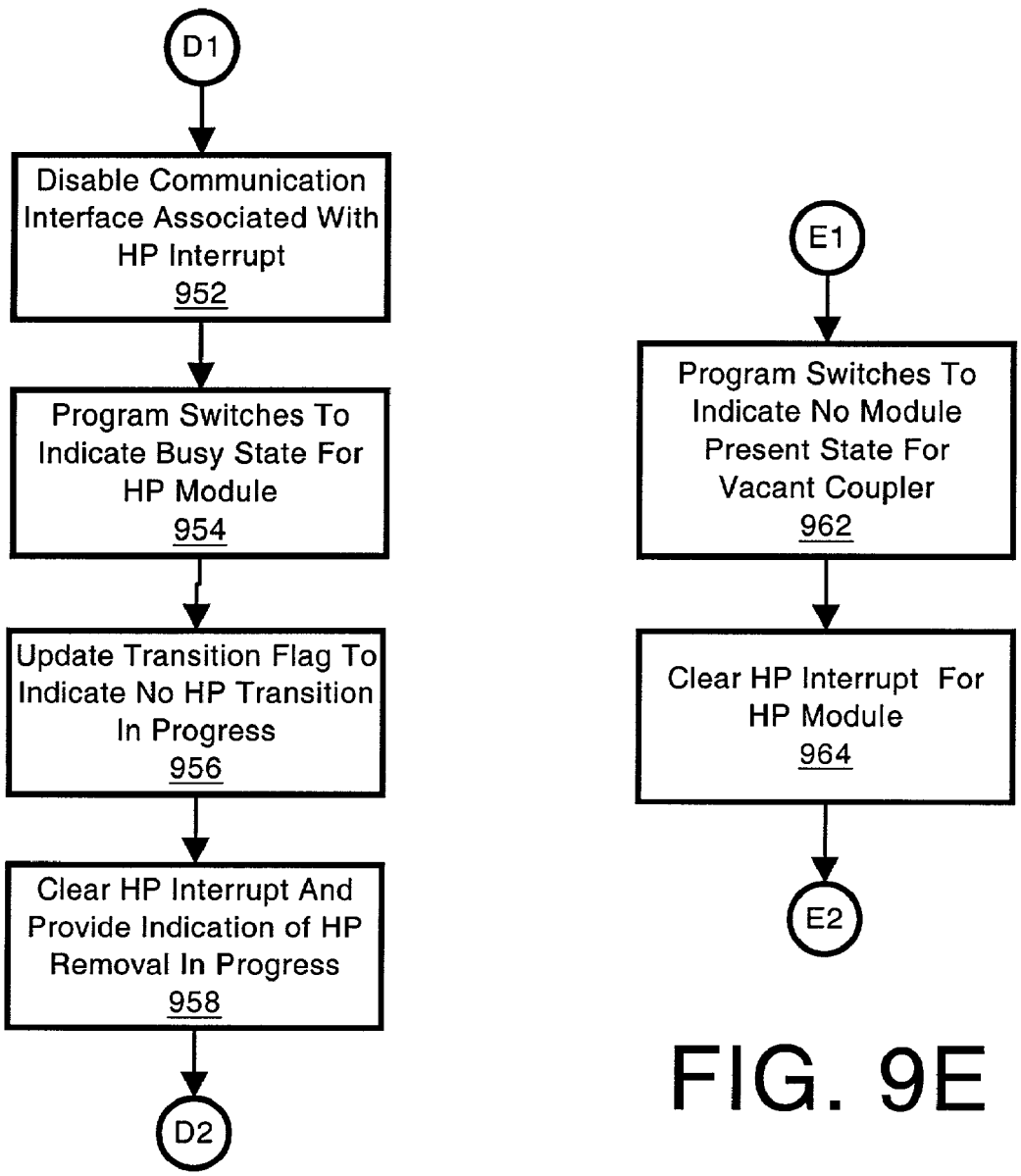
Figure 9F:
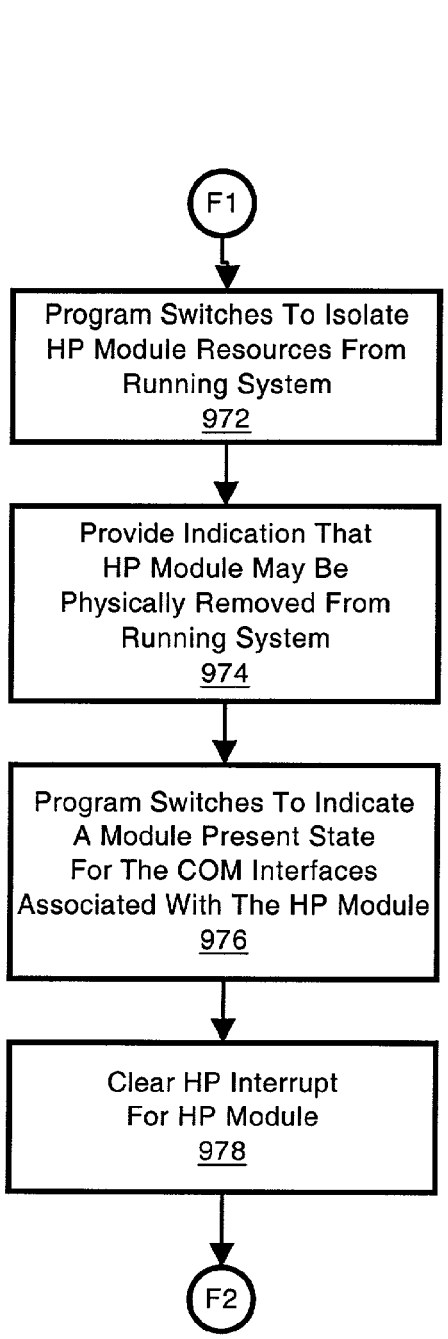
Figure 9G:
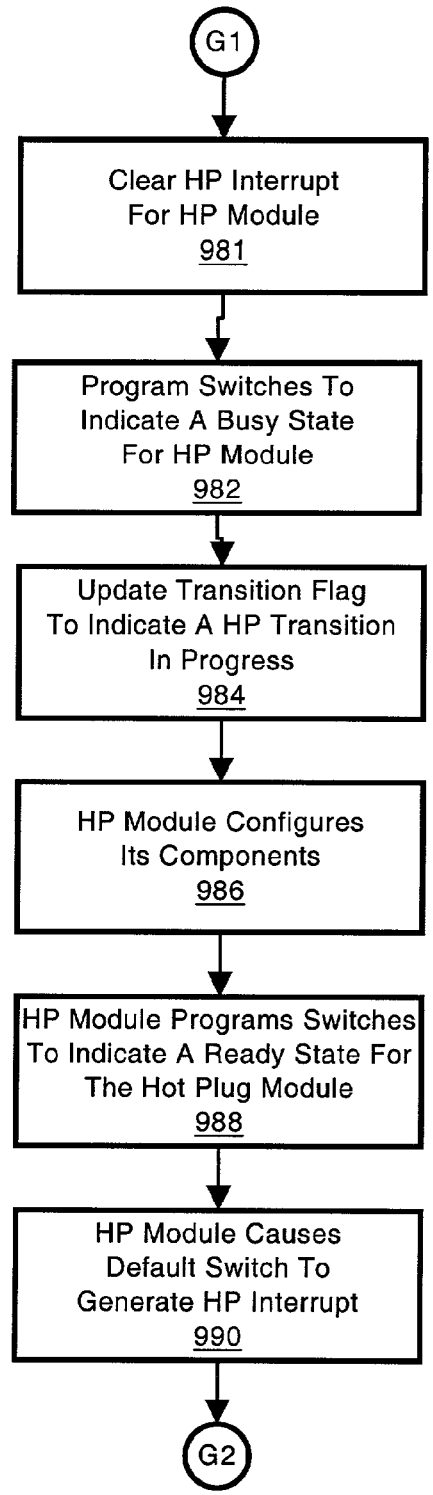
Figure 9H:
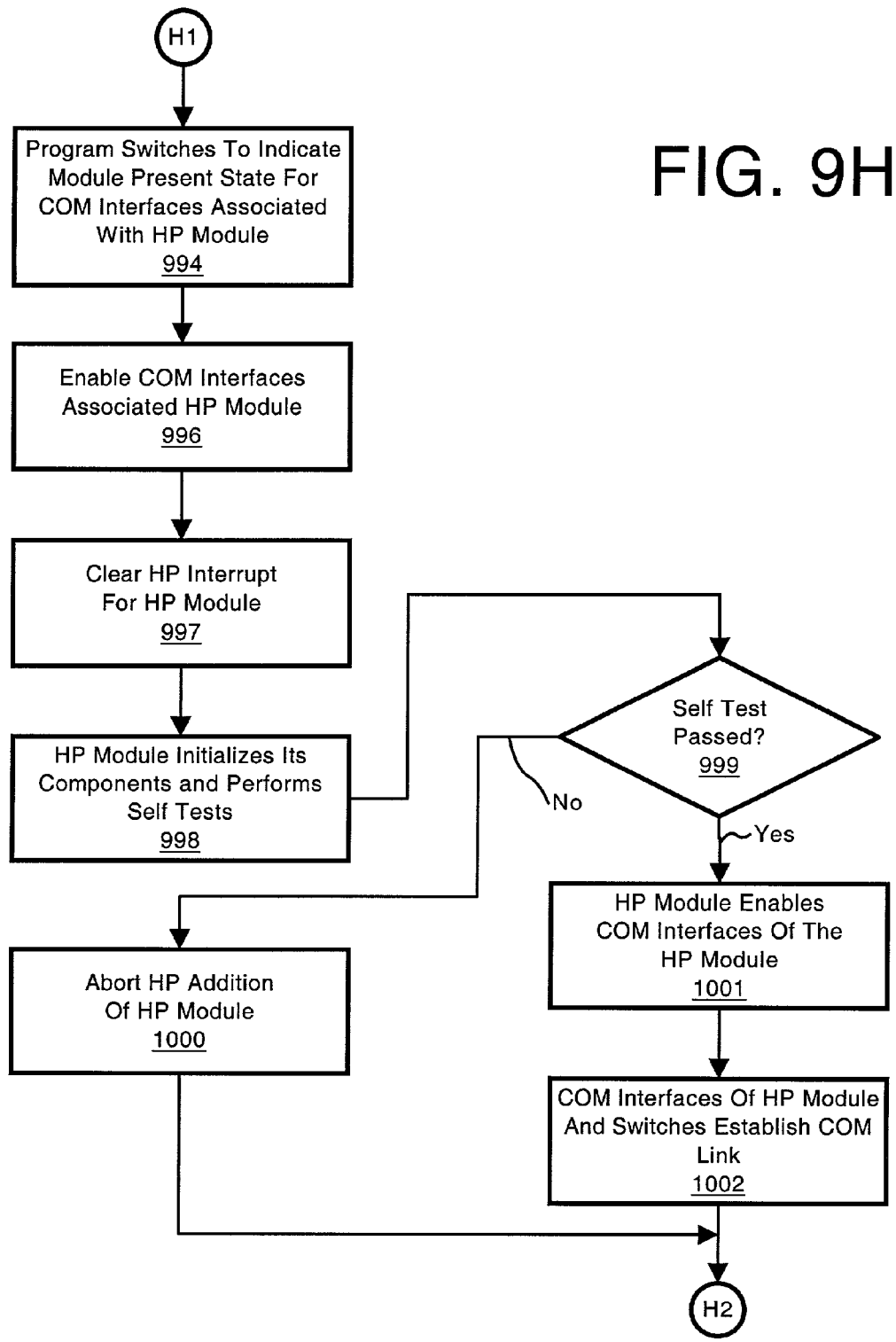

Referring now to FIG. 9A, the running computing device 100 in block 902 may determine whether hot plug removal of a hot plug module 110 has been requested in response to receiving a hot plug interrupt. In an example embodiment, the running computing device 100 may determine whether hot plug removal of a hot plug module 110 has been requested based upon the interface control registers 706 of the midplane 120. For example, the running computing device 100 may determine that hot plug removal of a hot plug module 110 has been requested if an interface control register 706 associated with the hot plug module 110 has a scratch pad field 762 that indicates a joined state (state 4 of FIG. 8) and has either a set GPIO1 state field 754 or a set interrupt request field 744. In an example embodiment, a set GPIO1 state field 754 indicates receipt of a removal request signal from the removal request mechanism 270 and a set interrupt request field 744 indicates a pending hot plug interrupt which may have been set by management software of the running computing device 100.

In response to determining that hot plug removal of a hot plug module 110 has been requested, the running computing device 100 in block 904 (FIG. 9B) may provide an indication that a hot plug removal of the hot plug module 110 is in progress. The running computing device 100 may program the status indicator 260 of the hot plug module 110 to indicate a hot plug removal in progress by setting the GPIO0 state field 752 and the GPIO0 enable field 748 of the GPIO0 pin 630 that is coupled to the status indicator 260. In block 906, the running computing device 100 may clear the hot plug interrupt for the hot plug module 110. If the hot plug interrupt was generated in response to a removal request mechanism 270 being actuated, the running computing device 100 may clear the hot plug interrupt and the removal request mechanism 270 by setting the GPIO0 state field 752 and the GPIO0 enable field 748 associated with the removal request mechanism 270. Further, if the hot plug interrupt was generated via management software, the running computing device 100 may clear the hot plug interrupt by clearing the interrupt request field 744 of the default switch 624.

The running computing device 100 in block 908 may identify resources on the hot plug module 110. The running computing device 100 may identify processor resources of the hot plug module 110 via system reset registers of the node controller 210. Further, the running computing device 100 may identify memory resources of the hot plug module 110 via memory interleave registers of the node controller 210. The running computing device 100 may further utilize ASL (ACPI Source Language) methods to identify I/O resources of the hot plug module 110.

In block 910, the running computing device 100 may remove the identified memory resources of the hot plug module 110 from the running computing device 100. The running computing device 100 may move data from used memory locations of the hot plug module 110 to memory 240 and/or virtual memory of the running computing device 100 that will remain after the removal of the hot plug module 110. Further, the running computing device 100 may remove software references to the memory 240 physically located on the hot plug module 110.

The running computing device 100 in block 912 may remove the identified I/O resources of the hot plug module 110. The running computing device 100 may cause the I/O devices on or coupled to the hot plug module 110 to flush buffers and complete outstanding requests. Further, the running computing device 100 may cause the I/O hub 510 to write back modified cache lines of its associated memory cache 512 to the running computing device 100. The running computing device 100 may also stop and power down the I/O devices after the I/O devices complete outstanding requests, flush buffers, and write back modified cache lines.

In block 914, the running computing device 100 may remove the identified processor resources of the hot plug module 110. The running computing device 100 may remove processors 230 of the hot plug module 110 as interrupt targets and may remove the processors 230 from an list of active processors. Further, the running computing device 100 may cause the processors 230 of the hot plug module 110 to write back and invalidate their associated memory caches 232. The running computing device 100 may also cause the processors 230 to halt execution or enter a tight loop with interrupts disabled.

The running computing device 100 in block 916 may update the snoop filters 640 of the switches 624. For example, the running computing device 100 may update the valid vector 646 of the snoop filters 640 to mark the hot plug module 110 and associated communication interfaces 628 as invalid snoop agents. By marking them as invalid snoop agents, the snoop filters 640 may properly respond to snoop requests directed to shared cache lines of the hot plug module 110 that the hot plug module 110 did not invalidate prior to being removed. Alternatively, the snoop filters 640 may update the presence vectors of the storage 644 to indicate that no cache lines are present on the hot plug module 110 to be removed, or disable a snoop filter 640 dedicated to the hot plug module 110 to be removed.

The running computing device 100 in block 918 may wait for pending transactions associated with the hot plug module 110 to complete. For example, the running computing device 100 may wait an amount of time (e.g. 2 seconds) that is sufficient for pending transactions to complete with a reasonably high amount of certainty. Alternatively, the running computing device 100 may wait for the snoop filters 640 of the switches 624 to signal completion of the pending transactions.

The running computing device 100 may further disable the communication interfaces 628 of the switches 624 associated with the hot plug module 110 to be removed (block 920). The running computing device 100 may disable the communication interfaces 628 by clearing the interface enable fields 746 associated with the communication interfaces 628 of the switches 624. As a result of disabling the communication interfaces 628, interface logic 704 associated with the communication interfaces 628 may not receive framing packets, thus causing the associated interface control register 706 of the default switch 706 to generate a hot plug interrupt upon a change in the framing detected signal.

The running computing device 100 in block 930 (FIG. 9A) may determine whether a hot plug module 110 is ready to join the running computing device 100. The running computing device 100 may determine whether a hot plug modules 110 is ready to join the running computing device 100 based upon the interface control registers 706 of the midplane 120. For example, the running computing device 100 may determine that a hot plug module 110 is ready to join the running computing device 100 if an interface control register 706 associated with the hot plug module 110 has a set interrupt request field 744 and a scratch pad field 762 that indicates a ready state (state 3 of FIG. 8).

In response to determining that a hot plug module 110 is ready to join the running computing device 100, the running computing device 100 in block 932 (FIG. 9C) may clear the pending hot plug interrupt for the identified hot plug module 110. The running computing device 100 may clear the hot plug interrupt by clearing the interrupt request field 744 of the default switch 624.

The running computing device 100 in block 934 may identify processors 230 provided by the hot plug module 110 and may add the identified processors 230 to a processor pool for the running computing device 100. For example, the running computing device 100 may identify processors 230 of the hot plug module 110 based upon system reset registers of the hot plug module 110, and may cause the identified processors 230 to be added to a pool of processors for the running computing device 100. Further, the running computing device 100 may cause the identified processors 230 to start execution from a predetermined entry point of the operating system of the running computing device 100 so that operating system may schedule execution of processes and/or threads on processors of the processor pool.

The running computing device 100 in block 936 may also identify memory 240 provided by the hot plug module 110 and may add the identified memory 240 to the running computing device 100. For example, the running computing device 100 may identify memory 240 supplied by the hot plug module 110 based upon memory interleave registers of the hot plug module 110. Further, the running computing device 100 may add the identified memory 240 to a memory pool of the operating system so that the operating system may allocate memory from the memory pool to processes and/or threads of the running computing device 100.

In block 938, the running computing device 100 may further identify I/O devices provided by the hot plug module 110 and may add the identified I/O devices to the running computing device 100. The running computing device 100 may utilize ASL methods to identify I/O devices supplied by or coupled to the hot plug module 110. The running computing device 100 may further initiate device drivers for the identified I/O devices to make the identified I/O devices accessible to the operating system of the running computing device 100.

In an example embodiment, the running computing device 100 may allow only one hot plug module 110 at a time to proceed past the module present state (state 1 of FIG. 8) and join the running computing device 100. The running computing device 100 may maintain a global transition flag that indicates whether a hot plug addition is already in progress. Since the hot plug module 110 has effectively joined the running computing device 100, the running computing device 100 in block 940 may update the transition flag to indicate that no hot plug addition is in progress so that another hot plug module 110 may proceed the with hot plug addition.

The running computing device 100 in block 942 may program the switches 624 to indicate a joined state (state 4 of FIG. 8) for the hot plug module 110 and associated communication interfaces 628. In particular, the running computing device 100 may program the scratch pad fields 762 of the associated interface control registers 706 to indicate the joined state.

The running computing device 100 in block 944 may update the snoop filters 640 of the switches 624. For example, the running computing device 100 may update the valid vector 646 of the snoop filters 640 to mark the hot plug module 110 and associated communication interfaces 628 as valid snoop agents if the hot plug module 110 comprises a memory cache 232, 512. By marking them as valid snoop agents, the snoop filters 640 may track snoop results received from the hot plug module 110 and respond to snoop requests directed to cache lines of the hot plug module 110. Alternatively, the snoop filters 640 may maintain the presence vectors of the storage 644 to indicate which cache lines are present on the hot plug module 110, or enable a snoop filter 640 dedicated to the hot plug module 110.

In block 950 (FIG. 9A), the running computing device 100 may determine whether a hot plug module 110 has aborted the hot plug addition process. The running computing device 100 may determine whether a hot plug module 110 has aborted the hot plug addition process based upon the interface control registers 706 of the midplane 120. A scratch pad field 762 with a busy state or a ready state may indicate that the associated hot plug module 110 is being added to the running computing device 100. Further, a cleared framing detected field may indicate that the associated hot plug module 110 is no longer communicating with the midplane 120 and a set GPIO1 state field 754 may indicate that a removal request signal was received from a removal request mechanism 270 of the hot plug module 110. Accordingly, the running computing device 100 may determine that a hot plug module 110 has aborted hot plug addition if an associated interface control register 706 has a scratch pad field 762 that indicates a busy state or a ready state (state 2 or state 3 of FIG. 8) and has either a set GPIO1 state field 754 or a cleared framing detected field 756.

In response to determining that a hot plug module 110 has aborted hot plug addition, the running computing device 100 in block 952 (FIG. 9D) may disable the communication interfaces 628 associated with the identified hot plug module 110. The running computing device 100 may disable the communication interfaces 628 by clearing the interface enable fields 746 of the associated interface control registers 706. The running computing device 100 in block 954 may further program the switches 624 to indicate a busy state (state 2 of FIG. 8) for the associated communication interfaces 628. In particular, the running computing device 100 may program the scratch pad fields 762 of the associated interface control registers 706 to indicate the busy state. The running computing device 100 may further update the transition flag to indicate that no hot plug addition is in progress since the identified hot plug module 110 has aborted the hot plug addition process (block 956). As a result, another hot plug modules 110 may proceed the with hot plug addition process.

The running computing device 100 in block 958 may clear the hot plug interrupt for the hot plug module and may provide an indication that the running computing device 100 recognized abortion of the hot plug addition. For example, the running computing device 100 may clear the hot plug interrupt and program the status indicator 260 of the hot plug module 110 to indicate that a hot plug removal of the hot plug module 110 is in progress by setting the GPIO0 state fields 752 and the GPIO0 enable fields 748 associated with the status indicator 260 and the removal request mechanism 270.

In block 960 (FIG. 9A), the running computing device 100 determines whether a hot plug module 110 has been physically removed from the running computing device 100. The running computing device 100 may determine whether a hot plug modules 110 has been physically removed based upon the interface control registers 706 of the midplane 120. In particular, the running computing device 100 may determine that a hot plug module 110 has been physically removed if an interface control register 706 associated with the hot plug module 110 has a scratch pad field 762 that indicates a module present state (state 1 of FIG. 8) and a cleared module present field 740.

In response to determining that the hot plug module 110 has been physically removed, the running computing device 100 in block 962 (FIG. 9E) may program the switches 624 to indicate a no module present state (state 0 of FIG. 8) for the associated communication interfaces 628. To this end, the running computing device 100 may program the scratch pad fields 762 of the associated interface control registers 706 to indicate the no module present state. The running computing device 100 may further clear the hot plug interrupt for the hot plug module 110 (block 964). For example, the running computing device 100 may clear the interrupt request field 744 of the default switch 624 that is associated with the hot plug module 110.

In block 966 (FIG. 9A), the running computing device 100 may determine whether a hot plug module 110 may proceed with a hot plug addition. To this end, the running computing device 100 may determine to proceed with a hot plug addition in response to determining that the transition flag does not indicate another hot plug addition in progress.

In response to determining not to proceed with a hot plug addition, the running computing device 100 may exit and stop processing the hot plug interrupt. Otherwise, the running computing device 100 may determine in block 970 whether a hot plug module 110 that is being removed has de-established a communication link with the running computing device 100. The running computing device 100 may determine that a leaving hot plug module 110 has no established communication if an interface control register 706 associated with the hot plug module 110 has a cleared framing detected field 756, and has a scratch pad field 762 that indicates a busy state, a ready state, or a joined state (state 2, 3 or 4 of FIG. 8).

In response to determining that a leaving hot plug module 110 has ceased communication, the running computing device 100 in block 972 may program the switches 624 to isolate the hot plug module 110 from the running computing device 100. The running computing device 100 may program the remote module definition registers 778 of the switches 624 to indicate that no hot plug module 110 is coupled to the associated coupler 122. For processor/memory HPMs and memory HPMs, the running computing device 100 may further program the memory interleave registers 770 to indicate that there are no memory resources coupled to the associated coupler 122. For I/O memory HPMs, the running computing device 100 may further program the I/O map registers 780 to indicate that there are no I/O resources coupled to the associated coupler 122.

In block 974, the running computing device 100 may provide an indication that the hot plug module 110 may be physically decoupled from the midplane 120 and removed from the running computing device 100. The running computing device 100 may program the status indicator 260 of the hot plug module 110 to indicate that the hot plug module 110 may be physically removed from the running computing device 100 by (i) clearing the GPIO0 state field 752 and the GPIO0 enable field 748 associated with the GPIO0 pin 630 that is coupled to the status indicator 260 and (ii) setting the GPIO1 state field 754 and the GPIO1 enable field 750 associated with the GPIO1 pin 632 that is coupled to the status indicator 260.

The running computing device 100 in block 976 may further program the switches to indicate a module present state (state 1 of FIG. 8) by programming the scratch pad fields 762 of the associated interface control registers 706. The running computing device 100 may also clear the hot plug interrupt for the hot plug module 110 (block 978). For example, the running computing device 100 may clear the interrupt request field 744 of the default switch 624 that is associated with the hot plug module 110.

In block 980 (FIG. 9A), the running computing device 100 may determine whether a hot plug module 110 that is being added has established a communication link with the running computing device 100. In an example embodiment, the running computing device 100 may determine that a joining hot plug module 110 has begun communication if an interface control register 706 associated with the hot plug module 110 has a scratch pad field 762 that indicates a module present state (state 1 of FIG. 8), has a set framing detected field 756, and has a set acknowledgement detected field 758.

In response to determining that a hot plug module 110 that is being added has an established communication link, the running computing device 100 in block 981 (FIG. 9G) may clear the hot plug interrupt for the hot plug module 110. For example, the running computing device 100 may clear the interrupt request field 744 of the default switch 624 that is associated with the hot plug module 110. The running computing device 100 in block 982 may further program the switches to indicate a busy state (state 2 of FIG. 8) for the hot plug module 110 by programming scratch pad fields 762 of associated interface control registers 706. In block 984, the running computing device 100 may update the transition flag to indicate a hot plug addition in progress and to prevent other hot plug modules 110 from initiating a hot plug addition.

In block 986, the hot plug module 110 may configure its components. For example, the hot plug module 110 may configure one of its processors 230 as a node boot strap processor. The hot plug module 110 may further initialize its memory 240 and may program its memory interface registers 772 to properly allocate address ranges to its memory 240 and other memory 240 of the running computing device 100. The hot plug module 110 may also program its system reset registers 772 to identify the active processors 230 of the hot plug module 110, and may program its I/O map registers to properly allocate memory ranges to its I/O devices.

After configuring its components, the hot plug module 110 in block 988 may signal the running computing device 100 that it is ready to join. To this end, the hot plug module may program the switches 624 to indicate the ready state (state 3 of FIG. 8) for the hot plug module 110 by programming the scratch fields 762 of associated interface control registers 706. Further, the hot plug module 110 may cause a hot plug interrupt to be generated by setting the associated interrupt request field 744 of the default switch 624.

The running computing device 100 in block 992 (FIG. 9A) may determine whether a hot plug module 110 has been coupled to a previously vacant coupler 122 of the midplane 120. The hot plug monitor 634 may cause associated module present fields 740 to be set in response to a hot plug module 110 being coupled an associated coupler 122. Accordingly, the running computing device 100 may determine that a hot plug module 110 has been coupled to a vacant coupler 122 if an associated interface register 706 has a scratch pad 762 that indicates a no module present state (state 0 of FIG. 8), has a set module present field 740, and has a cleared interface enable field 746.

In response to determining that a hot plug module 110 has been coupled to a vacant coupler 122, the running computing device 100 in block 994 (FIG. 9H) may program switches 624 to indicate a module present state (state 1 of FIG. 8) for the communication interfaces 628 associated with the hot plug module 110. To this end, the running computing device 100 may program the scratch pad fields 762 of associated interface control registers 706 to indicate the module present state. Further, the running computing device 100 may enable in block 996 the communication interfaces 628 associated with the hot plug module 110 to establish a communications link between the hot plug module 110 and the midplane 120. The running computing device 100 may enable the communication interfaces 628 by setting the associated interface enable fields 746 of the switches 624. The running computing device 100 may further clear the hot plug interrupt for the hot plug module 110 (block 997). For example, the running computing device 100 may clear the interrupt request field 744 of the default switch 624 that is associated with the hot plug module 110.

In response to being coupled to the midplane 120, the hot plug module 110 in block 998 may initialize components of the hot plug module 110 and may perform self tests. For example, a processor 230 of the hot plug module 110 or a system management processor 636 may initialize components and/or perform self tests while the communication interfaces 214 of the hot plug module 110 are disabled. The coupler 112 of the hot plug module 110 may comprise switches (not shown) that may isolate the hot plug module 110 from data, control, interrupt and/or other signals from data, control and/or other signals of the running computing device 100 in response to the associated communication interfaces 214 being disabled.

In example embodiment, the hot plug module 110 may determine in block 999 whether the hot plug module 110 passed the self test. In response to determining that the hot plug module 110 failed the self test, the hot plug module 110 in block 1000 may abort the hot plug addition process. By aborting the hot plug addition process before enabling its communication interfaces 214, the hot plug module 110 may lessen the likelihood of crashing the running computing device 100 due to a malfunction of the hot plug module 110.

In response to passing the self test, the hot plug module 110 may enable in block 1001 its communication interfaces 214 to establish a communication link with communication interfaces 628 of the switches 624 and to couple signals of the hot plug module 110 to signals of the running computing device 100. For example, a processor 230 of the hot plug module 110 or a system management processor 636 of the midplane 120 may enable the communication interfaces 214 by setting associated interface enable fields 746 of the hot plug module 110.

In block 1002, the enabled communication interfaces 214 of the hot plug module 110 may establish a communication link with the communication interfaces 628 of the midplane 120. The communication interfaces 214, 628 may initiate a framing process in response to being enabled. As a result of the framing process, the interface logic 704 associated with the communication interfaces 214, 628 may set the framing detected fields 756 in response to detecting a predetermined number of framing packets and may set the acknowledgement detected fields 758 in response to detecting a predetermined number of acknowledgement packets. It should be appreciated that the default switch 624 may generate a hot plug interrupt in response to the interface logic detecting a predetermined number of framing packets and setting the framing detected field 756 of the default switch 624.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   receiving a request to remove a hot plug module from a running computing device; and
   updating a snoop filter of the running computing device to cease snooping of the hot plug module.

2. The method of claim 1 wherein updating comprises updating the snoop filter to indicate that the hot plug module is no longer a valid snooping agent.

3. The method of claim 1 wherein updating comprises updating a valid vector to indicate that the hot plug module is not a valid snooping agent.

4. The method of claim 1 wherein updating comprises disabling the snoop filter associated with the hot plug module.

5. The method of claim 1 wherein updating comprises marking all cache lines tracked by the snoop filter as not being present in the hot plug module.

6. The method of claim 1 wherein updating comprises updating presence vectors to indicate that associated cache lines are not present in the hot plug module.

7. A midplane comprising
   a plurality of couplers to detachably couple hot plug modules to a running computing device; and
   a switch to interconnect the plurality of couplers and to cease issuing snoop transactions to a coupler of the plurality of couplers associated with a hot plug module to be removed from the running computing device.

8. The midplane of claim 7 wherein the switch causes the hot plug module to be removed to write modified cache lines to a memory of the running computing device.

9. The midplane of claim 7 wherein
   the switch comprises a valid vector, and
   the switch issues snoop transactions only to couplers that the valid vector indicates are associated with valid snooping agents.

10. The midplane of claim 7 wherein
    the switch comprises presence vectors associated with cache lines of the hot plug module to be removed, and
    the switch updates the presence vectors to indicate that the hot plug module does not have copies of the associated cache lines.

11. The midplane of claim 7 wherein
the switch comprises a different snoop filter for each coupler of the plurality of couplers, and
the switch disables the snoop filter for the coupler associated with the hot plug module to be removed.

12. The midplane of claim 7 further comprising another switch to interconnect the plurality of couplers, wherein the switches collectively track states of cache lines of hot plug modules coupled to the couplers and cease to issue snoop transactions to the coupler associated with the hot plug module to be removed.

13. A machine readable storage medium for processing snoop transactions comprising a plurality of instructions that in response to being executed result in a computing device
causing caching agents associated with a coupler of the computing device to write back modified lines to a memory of the computing device; and
updating a valid vector to indicate that the coupler is no longer associated with one or more valid caching agents; and
updating the valid vector in response to a hot plug removal request.

14. The machine readable storage medium of claim 13, wherein the plurality of instructions in response to being executed further result in the computing device
updating the valid vector to indicate that another coupler of the computing device is now associated with one or more valid caching agents in response to a hot plug addition request.

15. The machine readable storage medium of claim 14, wherein the plurality of instructions in response to being executed further result in the computing device
clearing a bit of the valid vector that is associated with the coupler to indicate that the coupler is no longer associated with one or more valid caching agents, and
setting another bit of the valid vector that is associated with the another coupler to indicate that the another coupler is associated with one or more valid caching agents.

16. A computing device comprising,
a memory,
a hot plug module comprising a coupler and one or more caching agents having cached lines of the memory;
a midplane comprising a coupler detachably coupled to the coupler of the hot plug module and a snoop filter to track the cached lines of the one or more caching agents; and
a processor coupled to the hot plug module via the midplane, the processor to cause the snoop filter to mark the one or more caching agents as invalid snooping agents in response to a request to remove the hot plug module.

17. The computing device of claim 16, wherein
the hot plug module comprises a mechanism to generate the request to remove the hot plug module.

18. The computing device of claim 16, wherein the memory comprises a plurality of instructions that in response to being executed result in the request to remove the hot plug module being generated.

19. The computing device of claim 16, wherein the one or more caching agents comprises a processor and one or more associated memory caches.

20. The computing device of claim 16, wherein the one or more caching agents comprises an input/output hub and one or more associated memory caches.

21. A snoop filter comprising
storage to store coherency information for lines cached by caching agents of hot plug modules; and
a controller to update the coherency information in response to a request to remove a hot plug module from a computing device.

22. The snoop filter of claim 21 wherein the controller further updates the coherency information in response to a request to add a hot plug module to the computing device.

23. The snoop filter of claim 21 wherein the controller updates the coherency information to indicate that the hot plug module is no longer a valid snooping agent in response to the request to remove the hot plug module.

24. The snoop filter of claim 21 wherein the controller updates a valid vector of the coherency information to indicate that the hot plug module is no longer a valid snooping agent in response to the request to remove the hot plug module.

25. The snoop filter of claim 21 wherein the controller updates the coherency information by marking all tracked cache as not being present in the hot plug module in response to the request to remove the hot plug module.

26. The snoop filter of claim 21 wherein the controller updates the coherency information by updating presence vectors to indicate that associated cache lines are not present in the hot plug module in response to the request to remove the hot plug module.

* * * * *